United States Patent
Dillinger (10) Patent No.: US 9,586,463 B2
(45) Date of Patent: Mar. 7, 2017

(54) TOP FOR AN OPENABLE VEHICLE ROOF

(71) Applicant: AUDI AG, Ingolstadt (DE)

(72) Inventor: Andreas Dillinger, Kelheim (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 14/803,636

(22) Filed: Jul. 20, 2015

(65) Prior Publication Data

US 2016/0023546 A1 Jan. 28, 2016

(30) Foreign Application Priority Data

Jul. 25, 2014 (DE) ........................ 10 2014 010 962

(51) Int. Cl.
*B60J 7/12* (2006.01)
*B60J 7/057* (2006.01)
*B60J 7/02* (2006.01)
*B60J 7/14* (2006.01)

(52) U.S. Cl.
CPC ............ *B60J 7/1234* (2013.01); *B60J 7/026* (2013.01); *B60J 7/0573* (2013.01); *B60J 7/123* (2013.01); *B60J 7/1204* (2013.01); *B60J 7/1252* (2013.01); *B60J 7/146* (2013.01)

(58) Field of Classification Search
CPC ........ B60J 7/1234; B60J 7/1204; B60J 7/123; B60J 7/0573; B60J 7/026; B60J 7/1252; B60J 7/146
See application file for complete search history.

(56) References Cited

U.S. PATENT DOCUMENTS

| 6,299,234 | B1 | 10/2001 | Seel et al. |
| 6,695,385 | B1 * | 2/2004 | Lange .................... B60J 7/1243 296/107.07 |
| 2010/0148533 | A1 | 6/2010 | Kreiling | |

FOREIGN PATENT DOCUMENTS

| DE | 36 35 373 | 4/1988 |
| DE | 44 45 580 | 12/1995 |
| DE | 197 04 846 | 8/1998 |
| DE | 101 20 358 | 10/2002 |
| DE | 102 05 935 | 8/2003 |
| DE | 10 2004 003 021 | 8/2005 |

* cited by examiner

*Primary Examiner* — Glenn Dayoan
*Assistant Examiner* — Melissa A Black
(74) *Attorney, Agent, or Firm* — Henry M. Feiereisen LLC (57) ABSTRACT

A top for an openable vehicle roof, includes a front section constructed coupleable to a windshield cross member of a vehicle, a rear section configured pivotal and/or lowerable, a flexible section arranged between the front section and the rear section, wherein at least one of the front section and the flexible section is configured shiftable, and a self-supporting pushing- and/or pulling device for moving the flexible section, wherein during an opening process of the top the flexible section is foldable above the rear section so that an outer surface of the flexible section faces an outer surface of the front section.

19 Claims, 7 Drawing Sheets

TOP FOR AN OPENABLE VEHICLE ROOF

CROSS-REFERENCES TO RELATED APPLICATIONS

This application claims the priority of German Patent Application, Serial No. 10 2014 010 962.3, filed Jul. 25, 2014, pursuant to 35 U.S.C. 119(a)-(d), the disclosure of which is incorporated herein by reference.

BACKGROUND OF THE INVENTION

The present invention relates to a top for an openable vehicle roof.

The following discussion of related art is provided to assist the reader in understanding the advantages of the invention, and is not to be construed as an admission that this related art is prior art to this invention.

Tops for openable vehicle roofs are known in numerous variations. Normally the tops have at least two top sections, wherein a front first top section is coupleable with a windshield cross member and a rear second top section includes a flat rear window. These tops are mostly moved via a pivot point, wherein the top is moved high above the motor vehicle. This requires a very significant amount of force, and consequently also robust and heavy driving mechanisms and drives. The folding of the top is for example ensured by scissor joints. As an alternative to providing a pivot point, a top section can also be guided between longitudinal members of the vehicle roof. This means that at least one top section is configured movable.

From DE 197 04 846 A1 a top for a motorized puristic small motor vehicle is known, which are particularly designed as so-called roadsters or speedsters. In these small motor vehicles, a top middle section is supported on a rear part for pivoting between a position in which it is lowered between seat positions and a raised position in which it is supported on an upper edge of a windshield. Two tops which are guided by the top middle section and can be pushed together can be pushed in the raised position of the top middle section on both sides from a covered position behind the seating positions towards the front over the seating positions.

From DE 101 20 358 A2 a vehicle with a generic top for an openable roof is known. The motor vehicle includes two removable lateral roof frames with C-pillars adjoining the lateral roof frames toward the back. A moveable roof element, in particular a folding roof or a segmental arch roof, is received in guides of the lateral roof frames. A flat rear roof element, in particular a rear window, is pivotally supported on the vehicle body. In a fully opened rear end position, the movable roof element is received in a receiving area assigned to the flat roof element.

It would be desirable and advantageous to provide a top for an openable vehicle roof for a motor vehicle, which requires a low force for being moved between a closed position and a concealed storage position, and in the storage position occupies a smaller storage space than in conventional constructions.

SUMMARY OF THE INVENTION

According to one aspect of the present invention, a top for an openable vehicle roof, includes a front section constructed coupleable to a windshield cross member of a vehicle, a rear section configured pivotal and/or lowerable, a flexible section arranged between the front section and the rear section, wherein at least one of the front section and the flexible section is configured shiftable, and a self-supporting pushing- and/or pulling device for moving the flexible section, wherein during an opening process of the top the flexible section is foldable above the rear section so that an outer surface of the flexible section faces an outer surface of the front section To provide a top for an openable vehicle roof, that requires little force for movement from a closed position into a concealed storage position, and that requires less storage space than in conventional constructions, a third top section is configured flexible and arranged between a first front top section and second rear top section and is driven by a self-supporting pushing- and/or pulling-device. Hereby, the third cover section is foldable over the second top section during an opening process, so that after completion of the folding process an outer surface of the third top section is facing an outer surface of the second top section. Advantageously, in the closed position of the vehicle roof the third top section is tensioned between the first and the second top section. Due to the flexible configuration of the third top section, kinking of the third top section can largely be avoided. Furthermore, less chafe marks are generated than in vehicle tops known from the state of the art. The minimizing of chafe marks advantageously ensures a more aesthetic appearance of the top. Furthermore, the use of scissor joints can be avoided, which advantageously reduces the danger posed by the movement of top. Furthermore, the movement direction of the third top section can essentially correspond to a longitudinal direction of the vehicle. The construction according to the invention enables different designs for the motor vehicle so that the top can be easily adjusted to different vehicle types. Additionally, the top is not moved in a great arch over the vehicle, which advantageously resulting in less force being required to move the top, particularly under headwind conditions, so that smaller drives can be used. Furthermore, the top can move faster and less noise is generated during opening and closing the vehicle roof. Because the third top section rests against the second top section in an open position, the third top section can be lowered by a pivot motion of the second top section. This reduces the space required by the top in the stored position and more space is available in the interior of the vehicle or more storage space is available in the trunk of the vehicle.

In an advantageous embodiment of the top according to the invention, a first front top section can at least partially be configured rigid and can be pivotally connected to a first end of the foldable third top section. The pivotal connection can for example be implemented by hinges or elastic elements such as bands. This advantageously allows realizing a modular top. Additionally, the first top section can advantageously serve various functions. For example, the first top section can function as guiding element for the third top section. Furthermore, the first top section can have elements for locking the top on a vehicle body.

In a further advantageous embodiment of the top according to the invention, a second end of the foldable third top section can be pivotally connected to the second rear top section. Also in this case, the pivotal connection can for example be implemented by hinges or elastic elements such as bands.

In a further advantageous embodiment of the top according to the invention, the first front top section can be coupled to the pushing- and/or pulling-device, which essentially moves the first top section along the longitudinal direction of the vehicle, wherein during the opening process the first top section moves the third top section over the second top section and during a closing process pulls it off the second top section. In a possible embodiment, the top sections are approximately of the same length, so that in the open position of the top, the second top section is arranged below the third top section and the first top section above the third top section.

In a further advantageous embodiment of the top according to the invention, the pushing- and/or pulling device can include at least one chain with several pushing- and/or pulling elements, which are guided within a guide that is arranged in the region of the second top section. Additionally, a window pane sealing with a receiving slot can be arranged on the pushing- and/or pulling elements, into which a free edge of a side window can be moved. Furthermore, two respective adjacent pushing- and/or pulling elements can be interconnected via a pivot joint, wherein the two adjacent pushing- and/or pulling elements can be locked against each other by locking means. Due to the reciprocal locking, the at least one chain can be moved in a self-supporting manner. Thus the pushing- and/or pulling device can for example include two tracks, which each extend in longitudinal direction of the vehicle on lateral borders of the top. As an alternative, the pushing- and/or pulling device may include only one chain, which extends in longitudinal direction of the vehicle along a middle longitudinal axis of the top.

In a further advantageous embodiment of the top according to the invention, the pushing- and/or pulling device can include a drive, which moves the at least one chain. The drive can for example be coupled to the at least one chain by a drive pinion or a cable pull.

In a further advantageous embodiment of the top according to the invention, two adjacent pushing- and/or pulling elements can be reciprocally locked, for example by a toothed belt or a locking hook or a locking bolt. Furthermore, a separating element may unlock the locking elements between two adjacent pushing- and/or pulling elements during the opening process of the top. Additionally, a connecting element can be provided, which locks the locking elements between two adjacent pushing- and/or pulling elements to each other during the closing process of the top. Hereby, the connecting element can be arranged in opening direction in front of the separating element at a transition region between the second top section and the third top section.

Advantageously, the third top section may be made of an elastic material, which returns to a starting position after being subjected to load. Furthermore, the third top section can have at least one supporting element in longitudinal direction and/or transverse direction, which supports the third top section in the closed position. The least one supporting element can for example be configured as inflatable element and/or foldable metal element and/or plastic element. Advantageously, a stiffness of the third top section as well as a shape of the third top section can be predefined by the at least one supporting element. Furthermore, several supporting elements can form a framework across which the elastic material can be stretched.

In a further advantageous embodiment of the top according to the invention, the first top section can interlock with the windshield cross member via at least one locking element. Hereby, the locking elements can be constructed as locking bars or locking hooks or as corresponding receptacles, which interact with the locking bars or locking hooks. The locking bars or locking hooks and the receptacles can each be arranged on the vehicle body and/or on the top. In a preferred embodiment, the at least one locking element can be designed as extendible air deflector, which is retracted in the closed position of the top and which fixes the first top section at the windshield cross member. The air deflector can be extended before the opening process of the top and can release the first top section. Hereby, in the opened position of the top the air deflector can be extended or retracted as necessary.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
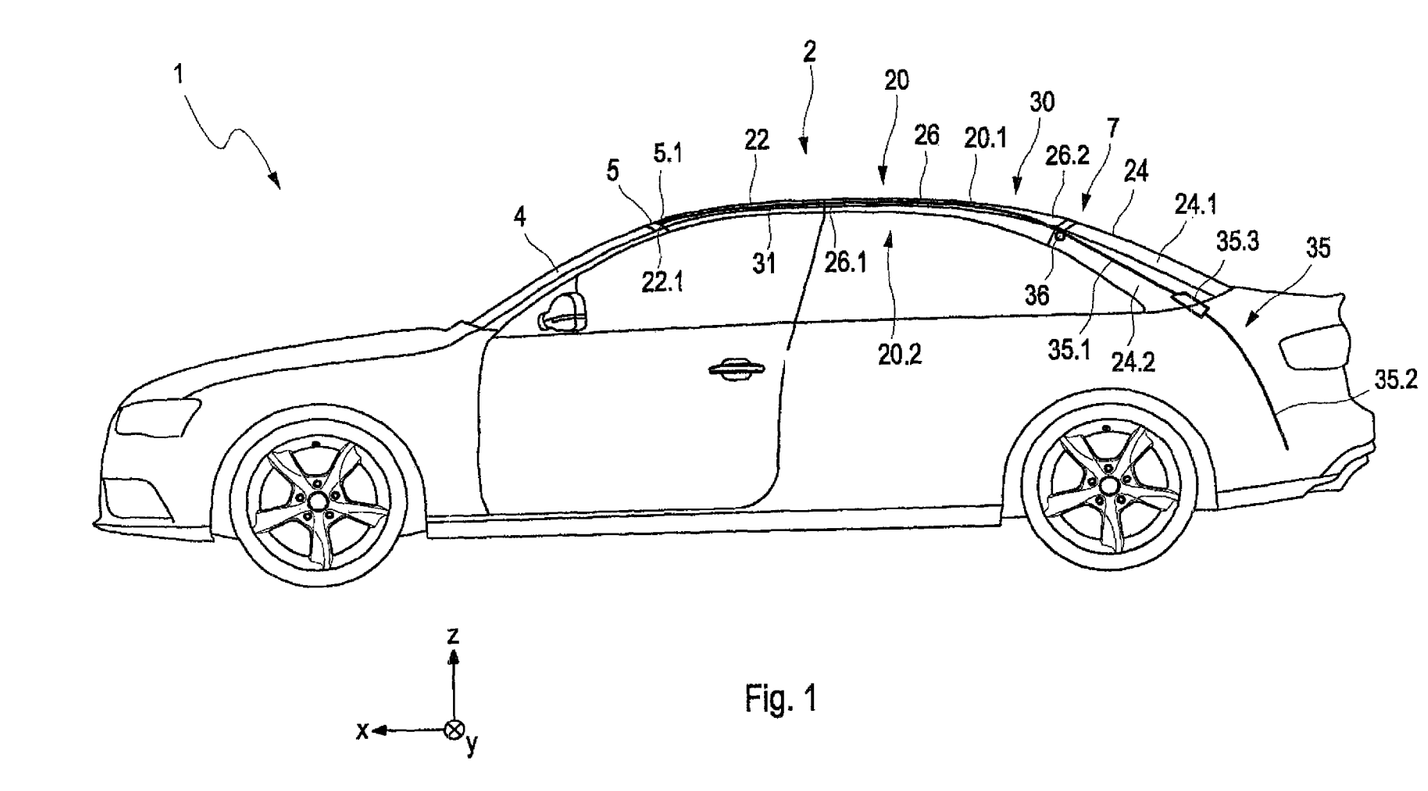
FIG. 1 shows a schematic side view of a vehicle with an exemplary embodiment of a top for a vehicle roof according to the invention in a closed position.
Figure 2:
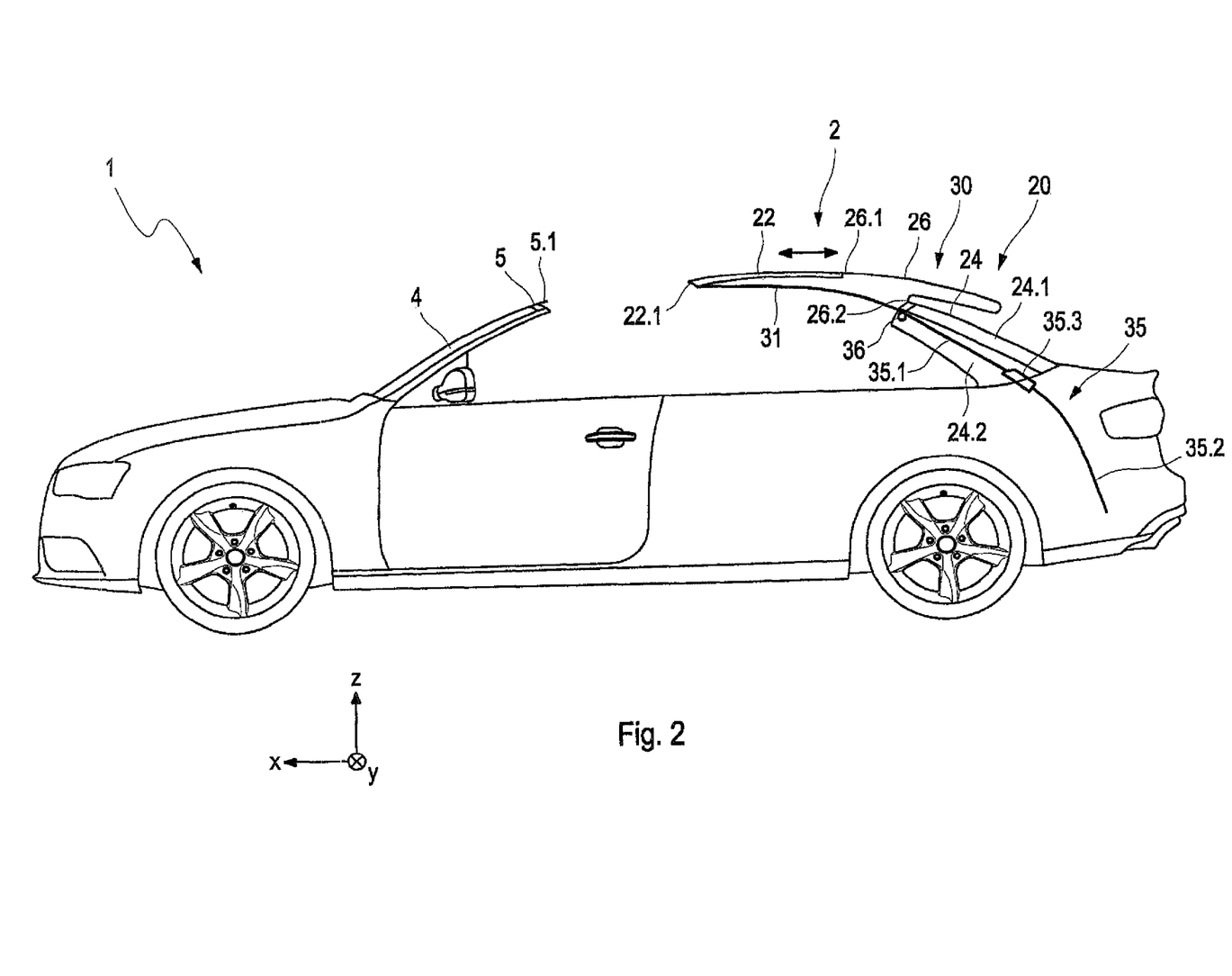
FIG. 2 shows a schematic side view of a vehicle with an embodiment of the top according to the invention as shown in FIG. 1 in a first intermediate position.
Figure 3:
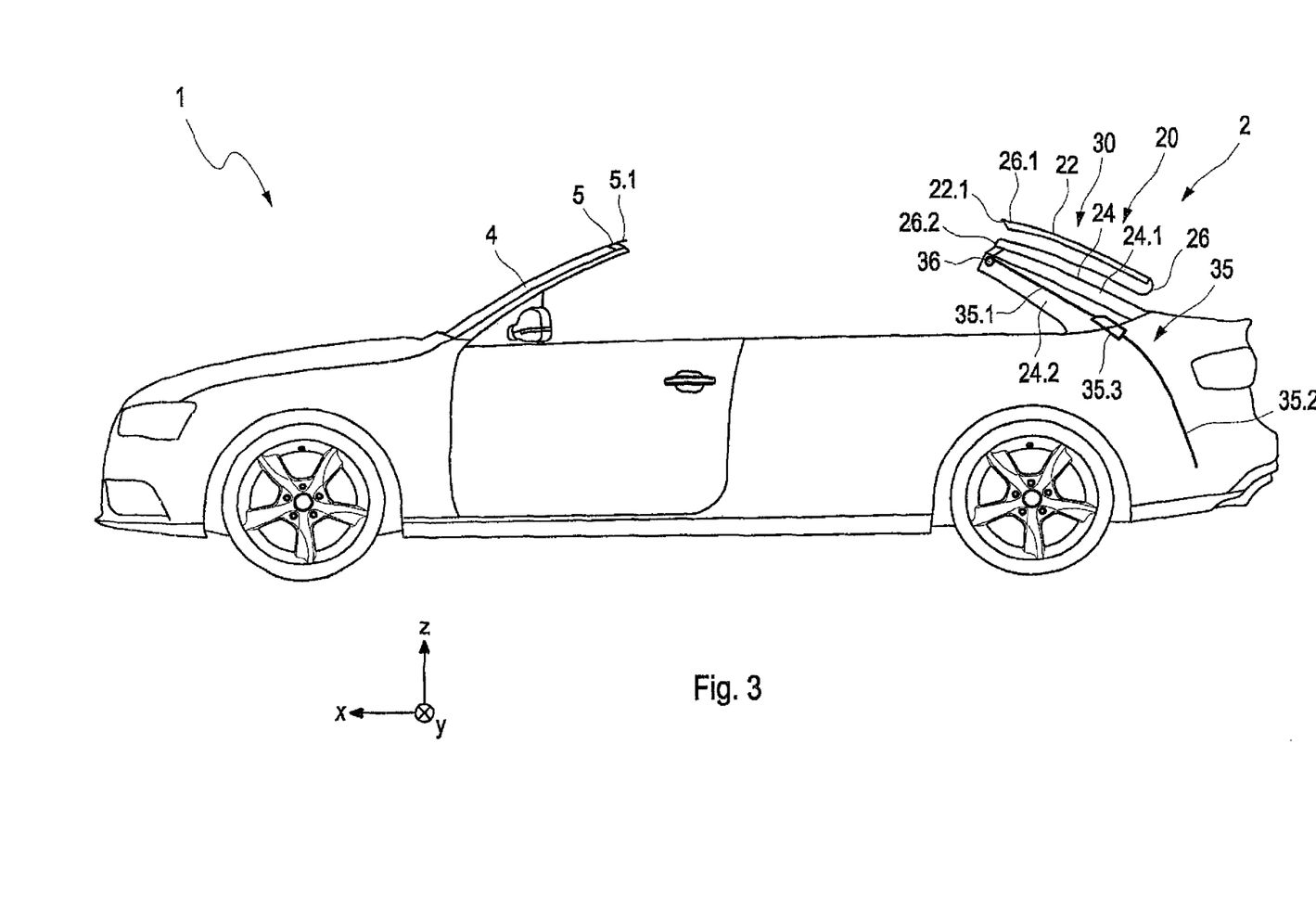
FIG. 3 shows a schematic side view of a vehicle with the exemplary embodiment of the top according to the invention of FIGS. 1 and 2 in a second intermediate position before lowering into a storage position.
Figure 4:
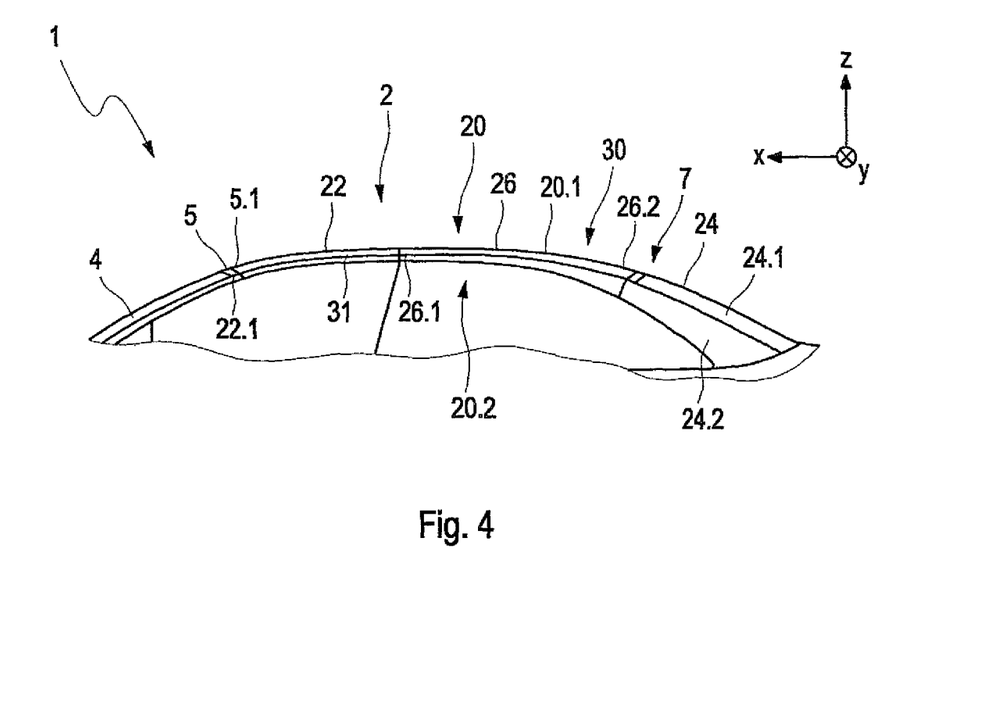
FIG. 4 shows a schematic side view of the vehicle roof of FIG. 1 in a closed position.
Figure 5:
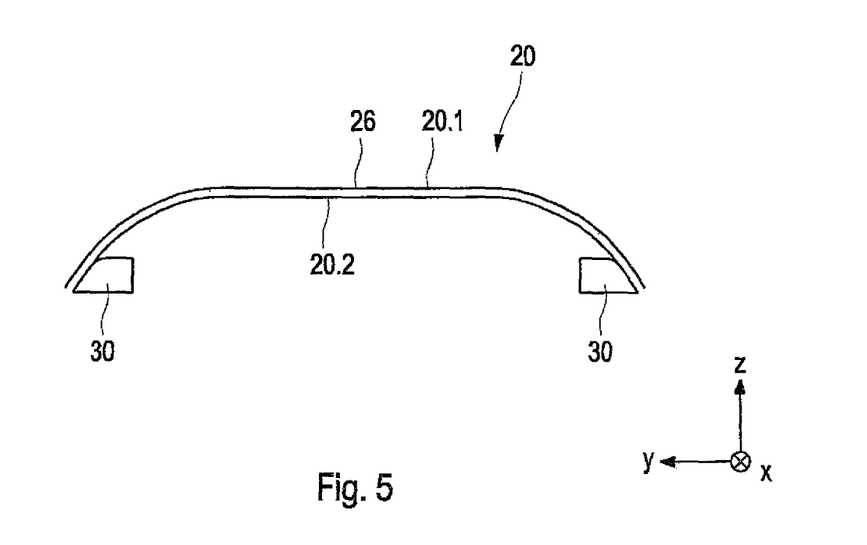
FIG. 5 shows a schematic sectional view of a third top section of the top according to FIGS. 1 to 4.

As can be seen in FIGS. 1 to 5, in the shown embodiments a vehicle 1 has a windshield cross member 5 and an openable vehicle roof 2 with a top 20. The vehicle roof 2 can assume a closed position as shown in FIGS. 1 and 4, an intermediate position as shown in FIGS. 2 and 3 and a storage position not shown in further detail. In the closed position, the top 20 closes the vehicle 1 from above so that neither wind nor moisture can enter the interior of the vehicle. In the intermediate position, the vehicle 1 is at least partially open towards the top. In the storage position, the top 20 is for example stored in a predefined storage space in the rear part of the vehicle. During transition from the closed position into the storage position and vice versa, the top 20 may assume several intermediate positions.

As shown in FIGS. 1 to 5, the top 20 for the openable vehicle roof 2 has multiple top sections 22, 24, 26, wherein a first front top section 22 is coupleable with the windshield cross member 5 and at least one top section 22, 26 is configured movable. A second rear top section 24 is configured pivotal and/or retractable.

According to the invention, a third top section 26 is configured flexible and arranged between the first top section 22 and the second top section 24, wherein the third top section 23 is drivable by a self-supporting pushing- and/or pulling device 30. Furthermore, the third top section 26 is foldable during an opening process over the second rear top section 24 such that, after the folding process is complete, an outer surface of the third top section 26 is facing an outer surface of the second top section 24.

As shown in FIGS. 1 to 5, a modular top 20 can be realized, which is adjustable to different vehicle types in a simple manner. Furthermore, the vehicle roof 2 does not have side members or longitudinal guides within which the first and third top section 22, 26 is guided during the opening process of the top 20. In the shown exemplary embodiment, the second rear top section 24 has a flat rear window 24.1. The top sections 22, 24, 26 are covered on the outer surface with a top fabric 20.1 and have a support structure 20.2, which carries a roof liner for the vehicle interior. In the top 20, insulation material not shown in detail can be arranged for acoustic- or thermal insulation.

As shown in FIGS. 1 to 5, the first front top section 22 is at least partially configured rigid and/or stiff and is pivotally connected to a first end 26.1 of the foldable third top section 26. A second end 26.2 of the foldable third top section 26 is pivotally connected to the second rear top section 24. Furthermore, the first front top section 22 is coupled to the pushing- and/or pulling device 30, which moves the first top section 22 essentially along the longitudinal direction x of the vehicle. As a result, during the opening process the first top section 22 moves the third top section 26 over the second top section 24. During a closing process, the first top section 22 pulls the third top section 26 from the second top section 24. Thus the first top section 22 acts as guiding element for the third top section 26. This means that the first top section 22 is moved directly by the pushing- and/or pulling device 30. Because the third top section 26 is connected to the first top section 22, the third top section 26 is driven by the pushing- and/or pulling device 30 via the first top section 22. The pushing- and/or pulling device 30 is connected to an end region of the first top section 22 facing the vehicle front and during opening of the top 20 pulls the first top section 22 with the third top section 26 in the direction of the vehicle rear and during closing of the top 20 in the direction of the vehicle front. In the shown exemplary embodiment, the top sections 22, 24, 26 are constructed approximately of equal length so that in the partially opened intermediate position the second top section 24 of the top 20, as shown in FIG. 3, is arranged below the third top section 26 prior to lowering into the storage position and the first top section 22 is arranged above the third top section 26. This means that in the opened position of the top 20, prior to lowering into the storage position, the outer surface of the third top section 26 faces the outer surface of the second top section 24 and the inner side of the first top section 22 faces the inner side of the third top section 26. Alternatively, the respective length of the top sections 22, 24, 26 can be varied. Thus the third top section 26 can for example be longer than the first top section 22 and/or longer than the second top section 24.

As is further shown in FIGS. 1 to 11, the pushing- and/or pulling device 30 includes at least one chain 31 with multiple pushing- and/or pulling elements 32, 32A, 32B, which are guided within a guide 35 that is situated in the region of the second top section 24. In the shown exemplary embodiment, the pushing- and/or pulling device 30 includes two chains 31, which for example extend in longitudinal direction x of the vehicle at the lateral borders of the top 20. In an alternative not shown exemplary embodiment, the pushing- and/or pulling device 30 includes only one chain 31, which extends in longitudinal direction x of the vehicle along a middle longitudinal axis of the top 20.

As particularly shown in FIGS. 6 to 11, two respective adjacent pushing- and/or pulling elements 32, 32A, 32B are connected to each other by a pivot joint 33, wherein the two adjacent pushing- and/or pulling elements 32, 32A, 32B are lockable to each other by locking means 34, 34A, 34B. The pushing- and/or pulling device 30 of the shown top 20 has in longitudinal direction x of the vehicle a chain 31 with a corresponding guide 35 on both lateral border. In the shown exemplary embodiments, the individual pushing- and/or pulling elements 32, 32A, 32B are configured to have identical measurements and a rectangular cross section. This result essentially in a straight course of the chain 31. In alternative exemplary embodiments, the individual pushing- and/or pulling elements 32, 32A, 32B can be provided with bent or trapezoidal cross section, so that the pushing- and/or pulling elements 32, 32A, 32B of the upper and lower side can have different edge lengths. Thereby, a bent shape of the chain 31 can be predefined. Furthermore, the individual pushing- and/or pulling elements 32, 32A, 32B of the chain 31 can have different dimensions and can thus be better adjusted to the mounting situation.

Figure 6:
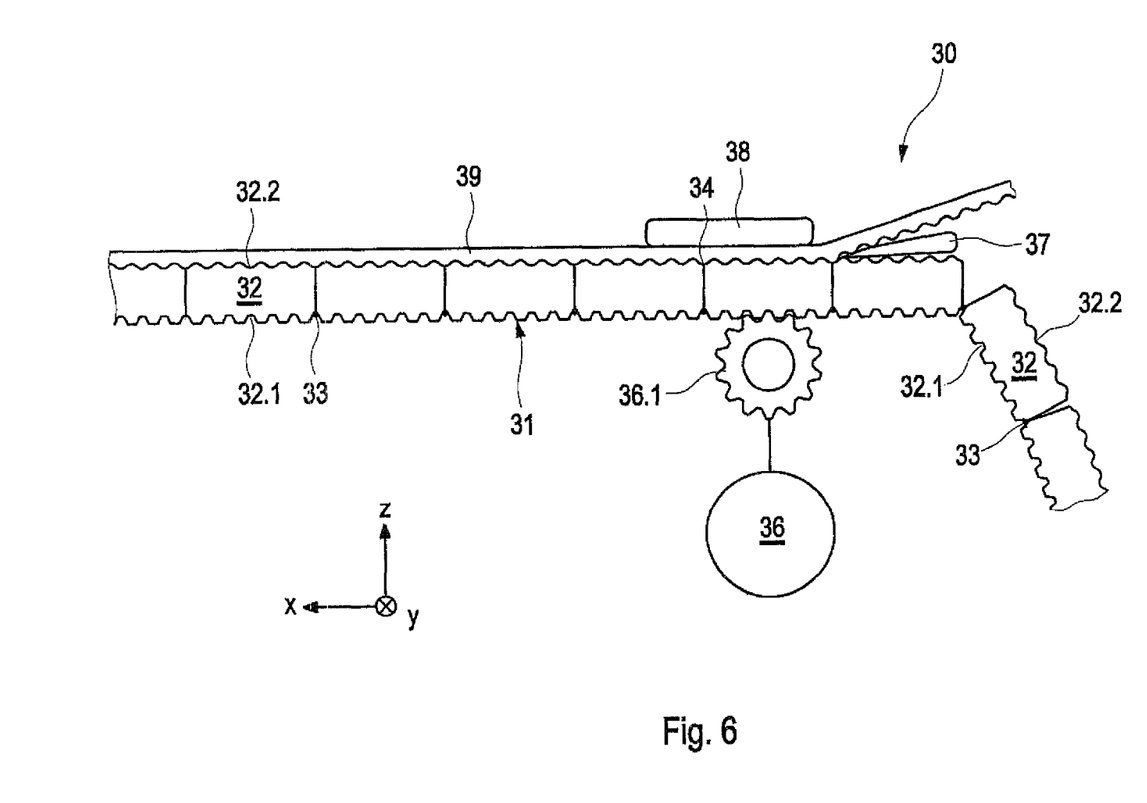
FIG. 6 shows a schematic representation of an exemplary embodiment of a pushing- and/or pulling device for the top according to the invention of FIGS. 1 to 5.

In an exemplary embodiment of the track 31 of the pushing- and/or pulling device 30 shown in FIG. 6, two adjacent pushing- and/or pulling elements 32 are lockable to each other by a toothed belt 39. For this purpose, a toothing of the toothed belt 39 engages into corresponding toothings 32.2 of the pushing- and/or pulling elements 32 and locks the adjacent pushing- and/or pulling elements 32 to each other. The toothed belt 39 can also be fixedly connected at one end to the end of the chain 31, with which the chain 31 is connected to the first top section 22. During the opening process of the top 20, a separating element 37 unlocks the locking 34 between two adjacent pushing- and/or pulling elements 32 and separates the toothing of the toothed belt 39 from the toothing 32.2 of each pushing- and/or pulling element 32. Furthermore, during the closing process of the top 20, a connecting element 38 locks the locking means 34 between two adjacent pushing- and/or pulling elements 32 to each other by pushing the toothing of the toothed belt 39 into the toothing 32.2 of the respective pushing- and/or pulling element 32. In the shown exemplary embodiment, the connecting element 38 is arranged in a transition region 7 between the second top section 24 and the third top section 26 in opening direction in front of the separating element 37. Alternatively, it is also conceivable to stiffen the chain 31 by a back pull, so that no toothing is required.

Figure 8:
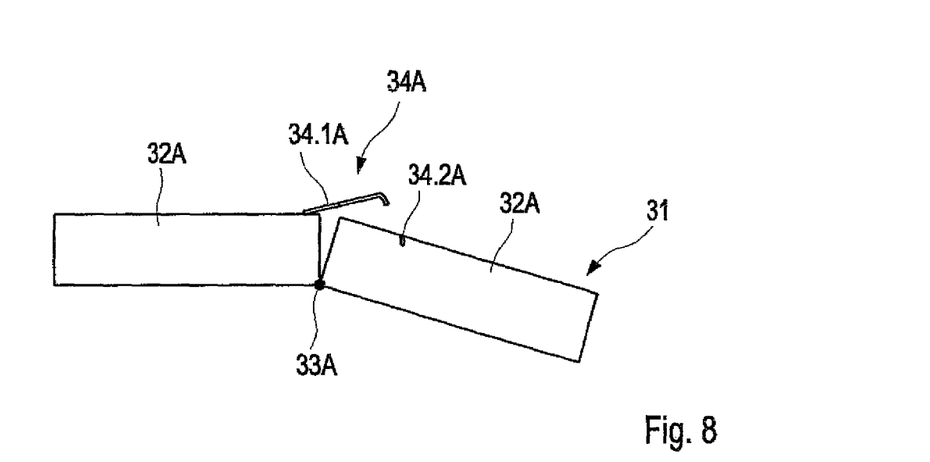
FIG. 8 shows a schematic sectional view of an exemplary embodiment of two adjacent pushing- and/or pulling elements in the unlocked position.
Figure 9:
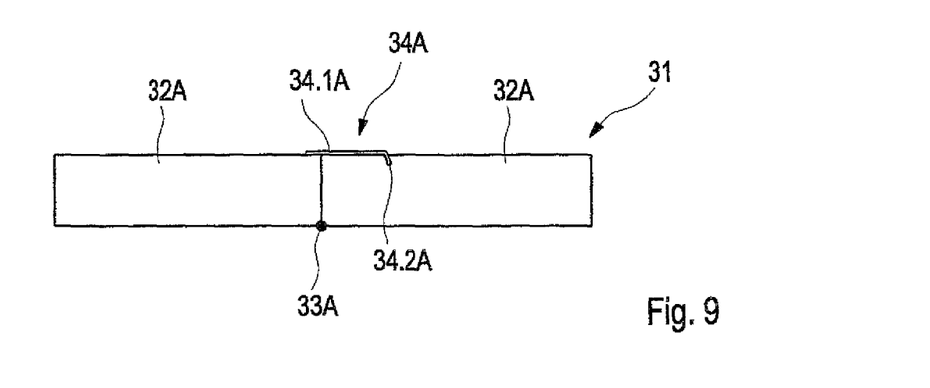
FIG. 9 shows a schematic sectional view of the two adjacent pushing- and/or pulling elements according to FIG. 8 in the locked position.

In an embodiment of the at least one chain 31 shown in FIGS. 8 and 9, two adjacent pushing- and/or pulling elements 32A are locked to each other by locking hooks 34.1A. In the locked position, the locking hook of a first pushing- and/or pulling element 32A engages behind a corresponding locking bridge 34.2A of a second pushing- and/or pulling element 32A. Analogous to the exemplary embodiment already described, a not further shown separating element, unlocks the locking 34A between two adjacent pushing- and/or pulling elements 32A during the opening process of the top 20 and separates the locking hook 34.1A from the locking bridge 34.2A. Furthermore, during the closing process of the top 20 a not further shown connecting element locks the locking means 34A between two adjacent pushing- and/or pulling elements 32 to each other.

Figure 10:
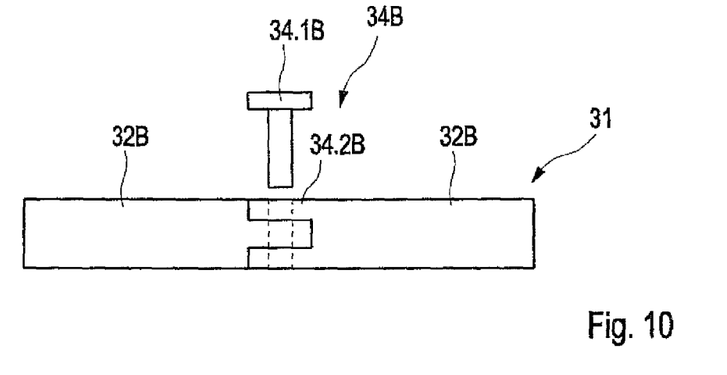
FIG. 10 shows a schematic sectional view of a further exemplary embodiment of two adjacent pushing- and/or pulling elements in the unlocked position.
Figure 11:
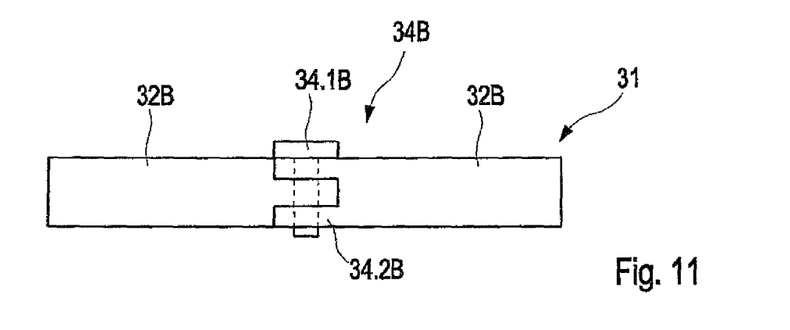
FIG. 11 shows a schematic sectional view of two adjacent pushing- and/or pulling elements according to FIG. 10 in the locked position.

In an exemplary embodiment shown in FIGS. 10 and 11 of the at least one chain 31, two adjacent pushing- and/or pulling elements 32B are locked to each other by locking bolts 34.1B. Hereby, the locking bolt 34.1B is guided in locked position through corresponding locking holes 34.2B of the adjacent pushing- and/or pulling elements 32B. Also in this embodiment, a not further shown separating element unlocks the locking 34B between two adjacent pushing- and/or pulling elements 32A during the opening process of the top 20 and moves the locking bolt 34.1B out of the locking holes 34.2B. Furthermore, during the closing process of the top 20 a not further shown connecting element locks the locking means 34B between two adjacent pushing- and/or pulling elements 32 to each other.

As shown in FIGS. 1 to 11, the pushing- and/or pulling device 20 includes a drive 36, which moves the at least one chain 31. As shown in FIG. 6, the drive 36 in the shown exemplary embodiment is coupled to the at least one chain 31 by a drive pinion 36.1. Hereby, a further toothing 32.1 is arranged on each individual pushing- and/or pulling element 32, which meshes with the drive pinion 36.1. Alternatively, the drive 36 can be coupled to the at least one chain 31 by a not further shown cable pull and can drive the chain 31.

Figure 7:
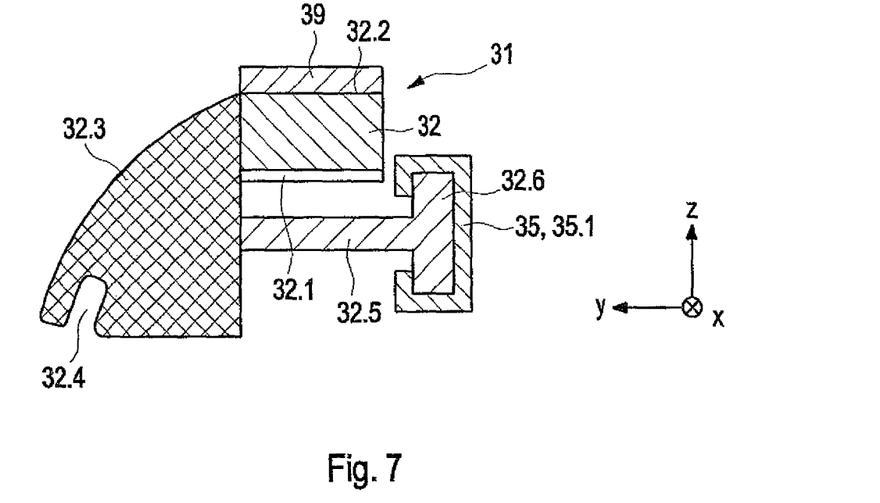
FIG. 7 shows a schematic sectional view of a pushing- and/or pulling element for the pushing- and/or pulling device according to FIG. 6.

As further shown in FIG. 7, a respective window pane sealing 32.3 with a receiving slot 32.4 can be arranged on each of the pushing- and/or pulling elements 32, into which a free border of a not shown side window is retractable. As further shown in FIG. 7, the individual pushing- and/or pulling elements 32 are connected to a lug 32.6 via a connection 32.5, which lug is guided in the guide 35. As shown in FIGS. 1 to 4, the guide 35 includes a first guide part 35.1 and a second guide part 35.2, which are connected to a coupling element 35.3 that is configured as a tilt joint and define a curved track to guide the at least one chain 31. Hereby, the first guide part 35.1 is retractable or may be pivoted into the storage position together with the second rear top section 24 by a lifting- and lowering device 24.

Figure 12:
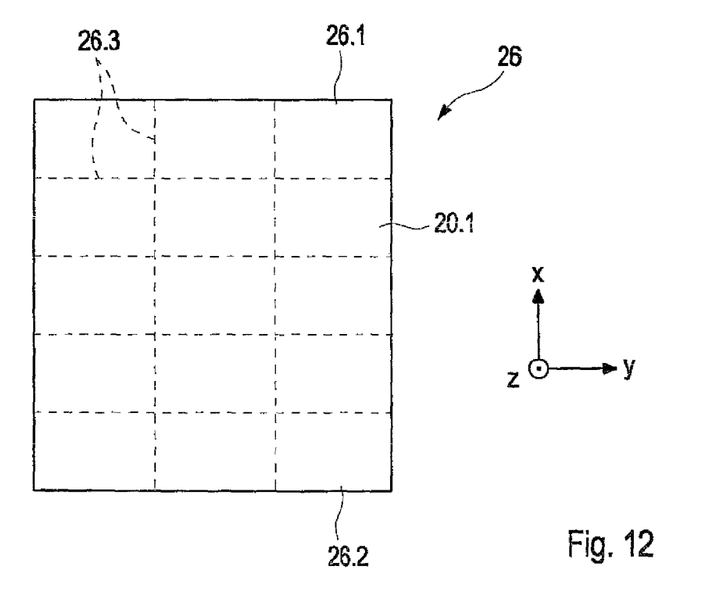
FIG. 12 shows a schematic top view of the third top section of the top according to FIGS. 1 to 5.

As shown in FIG. 12, the third top section 26 in the shown exemplary embodiment has at least one supporting element 26.3 in longitudinal direction x and/or transverse direction y. The third top section 26 can be made of an elastic material which after being subjected to a load returns into its starting position. This elastic material can for example form the waterproof and windproof top fabric 20.1. In the shown exemplary embodiment, the third top section 26 includes two supporting elements 26.3 extending in longitudinal direction x of the vehicle and six supporting elements 26.3 extending in transverse direction y of the vehicle. Hereby, the supporting elements 26.3 form a framework, across which the elastic material is stretched. This combination of elastic material and supporting elements 26.3 can be folded during the opening process and returns back to the starting position during the closing process of the vehicle roof 2. The at least one supporting element 26.3 can for example be configured as an inflatable element and/or as foldable metal element and/or plastic element.

As further shown in FIGS. 1 to 4, the first top section 22 can interlock with the windshield cross member 5 via at least one locking element 5.1. In the shown exemplary embodiment, the at least one locking element 5.1 is configured as extendible air deflector, which is retracted in the closed top position and fixes the first top section 22 on the windshield cross member 5. prior to the opening process of the top 20, the air deflector 5.1 is extended and releases the first top section 22. In the open position of the top, the air deflector 5.1 can be extended or retracted as necessary, to realize an air deflector function in the form of a so-called "aircap". Alternatively, the first top section 22 can conventionally have first locking elements, which interact with corresponding second locking elements arranged in or on the windshield cross member 5, in order to fix the top 20 on the windshield cross member 5 in the closed position of the top 20. Hereby, first locking elements can be provided as locking bars or locking hooks or mountings, which interact with second corresponding locking elements at the windshield cross member 5 that are designed as lock bars or lock hooks or mountings.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A top for an openable vehicle roof, comprising:
    a front section constructed coupleable to a windshield cross member of a vehicle,
    a rear section configured at least one of pivotal and lowerable;
    a flexible section arranged between the front section and the rear section, wherein at least one of the front section and the flexible section is configured shiftable; and
    a self-supporting pushing/pulling device operatively connected with the flexible section and configured to perform a substantially linear movement in longitudinal direction of the vehicle for moving the flexible section toward a front or rear of the vehicle in longitudinal direction of the vehicle, wherein during movement of the flexible section toward the rear of the vehicle the flexible section folds above the rear section so that an outer surface of the flexible section faces an outer surface of the front section.

2. The top of claim 1, wherein at least a part of the front section is configured at least one of rigid and stiff and is pivotally connected to a first end of the flexible section.

3. The top of claim 1, wherein a second end of the third section is pivotally connected to the rear section.

4. The top of claim 1, wherein the front section is coupled to the pushing- and/or pulling device, said pushing/pulling device essentially moving the front section along a longitudinal direction of the vehicle, wherein during the opening process of the top the front section moves the flexible section over the rear section and during a closing of the top the front section pulls the flexible section from the rear section.

5. The top of claim 1, wherein the pushing/pulling device comprises at least one chain having multiple pushing/pulling elements, said multiple pushing/pulling elements being guided in a guide arranged in a region of the rear section.

6. The top of claim 5, further comprising a respective window pane sealing arranged on each of the pushing/pulling elements, said window pane sealing having a receiving slot into which a free border of a side window is retractable.

7. The top of claim 5, wherein two respective adjacent ones of the pushing/pulling elements are connected by a pivot joint, said two adjacent pushing- and/or pulling elements being lockable to each other by locking means.

8. The top of claim 5, wherein the pushing/pulling device comprises a drive, which moves the at least one chain.

9. The top of claim 8, wherein the drive is coupled to the at least one chain by a drive pinion or a cable pull.

10. The top of claim 5, further comprising one of a toothed belt, a locking hook and a locking bolt wherein two adjacent ones of the pushing/pulling elements are lockable to each other by the toothed belt, the locking hook or the locking bolt.

11. The top of claim 10, further comprising a separating element which unlocks the locking means between two adjacent pushing/pulling elements during the opening of the top.

12. The top of claim 10, further comprising a connecting element which locks the locking means between the two adjacent pushing/pulling elements to each other during the closing of the top.

13. The top of claim 12, wherein the connecting element is arranged in a transition region between the rear section and the flexible section in opening direction in front of the separating element.

14. The top of claim 1, wherein the flexible section is made of an elastic material, which returns into a starting position after being subjected to a load.

15. The top of claim 1, wherein the flexible section has at least one supporting element in at least one of longitudinal direction and transverse direction.

16. The top of claim 15, wherein the at least one supporting element is configured as at least one of an inflatable element as a foldable metal element and a plastic element.

17. The top of claim 1, wherein the front section is lockable to the windshield cross member by at least one locking element.

18. The top of claim 17, wherein the at least one locking element is constructed as an extendible air deflector, which is retracted in the closed position of the top and fixes the front section on the windshield cross member.

19. The top of claim 18, wherein the air deflector is extended prior to the opening of the top and releases the first top section, and wherein the air deflector is extended or retracted in an opened position of the top.

* * * * *